United States Patent
Yang et al.

(10) Patent No.: US 9,606,845 B2
(45) Date of Patent: Mar. 28, 2017

(54) PROXY FOR ACCESSING A MIDDLEWARE SUBSYSTEM

(75) Inventors: Guoxing Yang, Pearland, TX (US); Nazih H. Hage, Cypress, TX (US); Christopher H. Stewart, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1050 days.

(21) Appl. No.: 13/411,816

(22) Filed: Mar. 5, 2012

(65) Prior Publication Data

US 2013/0232510 A1 Sep. 5, 2013

(51) Int. Cl.
*G06F 3/00* (2006.01)
*G06F 9/44* (2006.01)
*G06F 9/46* (2006.01)
*G06F 13/00* (2006.01)
*G06F 9/54* (2006.01)

(52) U.S. Cl.
CPC .............. *G06F 9/545* (2013.01); *G06F 9/541* (2013.01)

(58) Field of Classification Search
CPC ..................................................... G06F 9/545
USPC .......................................................... 719/328
See application file for complete search history.

(56) References Cited

U.S. PATENT DOCUMENTS

| | | | |
|---|---|---|---|
| 6,665,731 B1 | 12/2003 | Kumar | |
| 6,751,677 B1* | 6/2004 | Ilnicki et al. | 719/316 |
| 7,941,813 B1* | 5/2011 | Protassov et al. | 719/321 |
| 2003/0208637 A1 | 11/2003 | Hayduk | |
| 2009/0288012 A1* | 11/2009 | Hertel et al. | 715/738 |
| 2010/0235820 A1* | 9/2010 | Khouzam et al. | 717/148 |
| 2011/0307955 A1* | 12/2011 | Kaplan et al. | 726/23 |
| 2013/0060905 A1* | 3/2013 | Mickens et al. | 709/219 |

OTHER PUBLICATIONS msdn.microsoft.com, Windows—What are Metro Style Apps? (Sep. 2011) (3 pages).
www.wikipedia.com, Network Socket, Jan. 2012 (5 pages).

* cited by examiner

*Primary Examiner* — Timothy A Mudrick
(74) *Attorney, Agent, or Firm* — Trop, Pruner & Hu

(57) ABSTRACT

A first application is constrained from calling a middleware subsystem, where the middleware subsystem is able to access at least one feature selected from among a basic input/output system (BIOS) and hardware. The first application accesses the middleware system through a proxy, where accessing the middleware subsystem allows the first application to communicate with the at least one feature.

19 Claims, 2 Drawing Sheets

PROXY FOR ACCESSING A MIDDLEWARE SUBSYSTEM

BACKGROUND

An electronic device can include hardware components and a basic input/output system (BIOS). In addition, an electronic device can include an application that can communicate with the hardware components or the BIOS to perform various tasks. The communication between the application and BIOS or hardware components can be accomplished through an intermediate system.

BRIEF DESCRIPTION OF THE DRAWINGS

Some embodiments are described with respect to the following figures.

DETAILED DESCRIPTION

Figure 1:
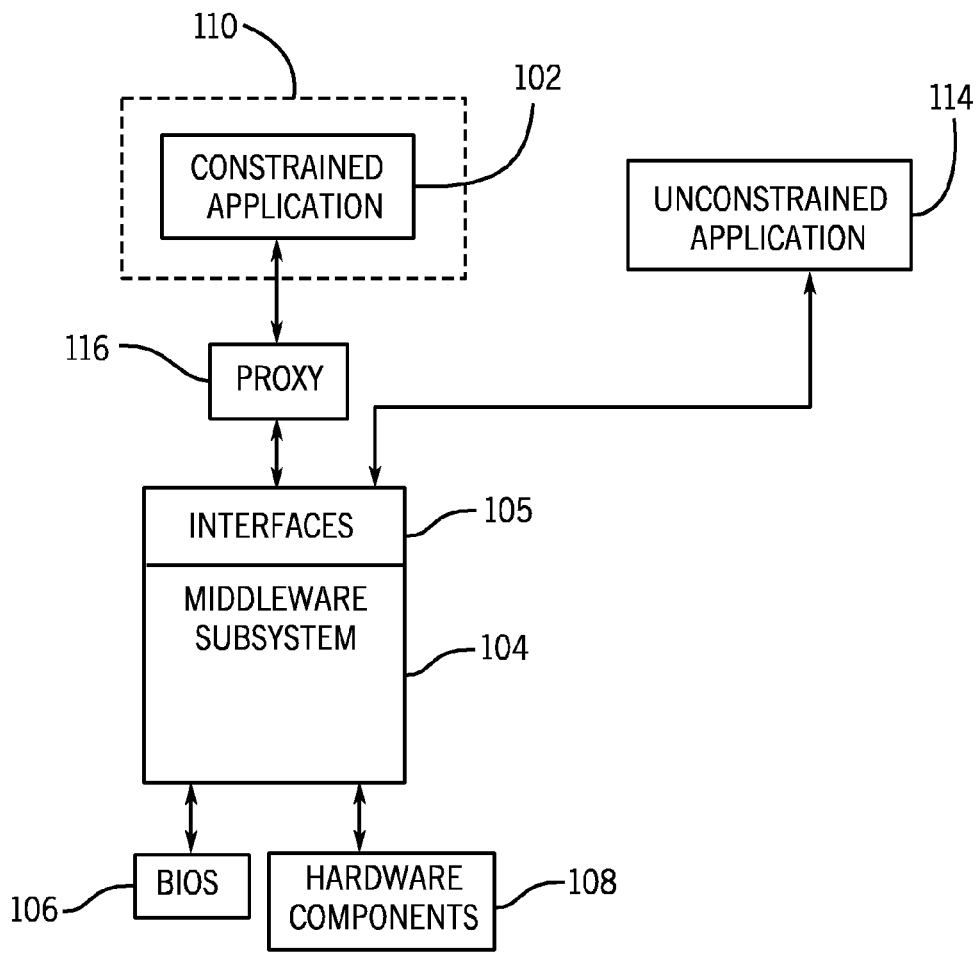
FIG. 1 is a block diagram of an example arrangement of components according to some implementations.

Certain applications in an electronic device are able to communicate with hardware components and/or a basic input/output system (BIOS) to perform predefined tasks. Examples of electronic devices include computers (e.g. desktop computers, notebook computers, tablet computers, server computers, etc.), personal digital assistants (PDAs), storage systems, communications systems, and so forth. Hardware components can include a processor, an input/output (I/O) device, a memory device, a disk drive, a user input device, and so forth. An "application" refers to machine-readable instructions that execute at a higher layer in the electronic device, such as a layer above an operating system of the electronic device.

The BIOS of an electronic device includes machine-readable instructions that are executed when the electronic device starts up. The BIOS can be used to initialize hardware components of the electronic device, and to load an operating system of the electronic device. Functions of the BIOS can also be accessed during normal operations of the electronic device after initial startup (and after the operating system has been loaded). For example, functions of the BIOS that can be accessed include a function to change the brightness of a display device, a function to increase or decrease speaker volume, a function to change a power state of the electronic device, and so forth.

In some examples, a middleware subsystem can be provided to allow applications to communicate with BIOS functions and/or hardware components. The middleware subsystem (which can be implemented as machine-readable instructions or a combination of machine-readable instructions and hardware controller(s)) provides a unified mechanism to provide abstract interfaces to the BIOS functions and/or hardware components. The abstract interfaces allow applications to not have to be configured to handle specific details associated with interfacing the BIOS functions and/or hardware components. Rather, the middleware subsystem is able to translate commands or data from applications into a form useable by the BIOS functions and/or hardware components.

In some examples, the middleware subsystem can provide application programming interfaces (APIs) that applications running in an electronic device can invoke for communicating with the BIOS functions and/or hardware components. In other examples, the middleware subsystem can provide other types of interfaces that are invocable by applications for communicating with BIOS functions and/or hardware components.

Some operating environments can implement security mechanisms that constrain certain types of applications from calling the middleware subsystem. Such applications can be referred to as "constrained applications." For example, such an operating environment can be an operating environment provided by the Windows® 8 operating system. In other examples, other types of operating environments can similarly provide security mechanisms to constrain an application from calling the middleware subsystem. An application "calling" a middleware subsystem can refer to the application invoking a feature, such as an interface (e.g. API), of the middleware subsystem.

An example security mechanism that constrains an application from calling the middleware subsystem can be a sandbox, which provides a container in which the application is executed. This container separates the application contained in the container from other applications. The presence of the container can prevent the application within the container from calling the middleware subsystem. In other examples, other types of security mechanisms can constrain an application from calling the middleware subsystem.

In accordance with some implementations, a proxy can be provided to allow a constrained application to access the middleware subsystem. The constrained application can provide commands and/or data to the proxy, which can then access the middleware subsystem according to the commands and/or data from the constrained application. By using the proxy, the constrained application, which is prevented from directly calling the middleware subsystem, is able to access the middleware subsystem so that the constrained application can communicate through the middleware subsystem with the BIOS functions and/or hardware components of the electronic device.

FIG. 1 is a block diagram of an example arrangement that includes a constrained application 102, a middleware subsystem 104, a BIOS 106, and hardware components 108. The constrained application 102 is contained in a container 110, where the container 110 provides a security mechanism (e.g. a sandbox) that constrains the application 102 from calling the middleware subsystem 104 (such as by invoking the interfaces 105 of the middleware subsystem 104). In examples where the interfaces 105 are APIs, the constrained application 102 is constrained from making API calls to the middleware subsystem 104.

In contrast, an unconstrained application 114 is able to invoke the interfaces 105 (such as by making API calls) of the middleware subsystem 104. In some examples, the constrained application 102 can be a Metro-style application associated with a Windows® 8 operating system, while the unconstrained application 114 is a different type of application, such as a desktop application, a mobile application, or other type of application.

To allow the constrained application 102 to access the middleware subsystem 104, a proxy 116 is provided. The constrained application 102 communicates commands and/or data to the proxy 116, which then directs the commands and/or data to the interfaces 105 of the middleware subsystem 104.

In some examples, the constrained application 102 can send a series of commands and/or data units (according to a defined format recognized by the proxy 116). The commands and/or data units to be communicated between the constrained application 102 and the middleware subsystem 104 using the proxy 116 can be in the form of documents according to a certain format. For example, such format can be the Extensible Mark-up Language (XML) format. In other implementations, documents for carrying the commands and data can be according to other formats.

The proxy 116 can de-serialize the series of commands and/or data units, and can invoke the interfaces 105 of the middleware subsystem 104 to allow access of the middleware subsystem 104 by the constrained application 102.

The proxy 116 can be implemented using one of several different types of mechanisms. In some implementations, the proxy 116 can include any one or combination of the following: a network socket connection, a driver, or a shared file mechanism. A network socket is an endpoint of a communication flow across a network. Thus, in examples where the proxy 116 includes a network socket connection, a network socket can be provided at the constrained application 102 and another network socket can be provided at the middleware subsystem 104. The network socket connection interconnects the network sockets.

A network socket can be defined by a network socket address, which can be a combination of an Internet Protocol (IP) address and a port number, for example. A network socket connection between network sockets can be established between entities within an electronic device, or alternatively, the network socket connection can be established over a network between remotely located entities.

In other implementations, the proxy 116 can be implemented as a driver that is able to call the middleware subsystem 104 on behalf of the constrained application 102. For example, the driver can be a plug-in driver, which can be operationally connected to the constrained application 102 using a plug-in interface. A driver that implements the proxy 116 can be considered a virtual driver, since the driver is not associated with a physical I/O device.

According to further implementations, the proxy 116 can include a shared file mechanism that allows communication between the constrained application 102 and the middleware subsystem 104 by use of a shared file (or files). The shared file can include commands and/or data provided by the constrained application 102 to access the middleware subsystem 104 to allow communication with BIOS functions and/or hardware components through the middleware subsystem 104. Such shared file can be written by the constrained application 102 to a storage location (in a storage medium) that is also accessible by the middleware subsystem 104. After the shared file is written to the storage location, the middleware subsystem 104 can read the shared file and retrieve the content of the shared file. Based on such content, the middleware subsystem 104 can perform the appropriate communication with the BIOS functions and/or hardware components. Information to be passed back from the accessed BIOS functions and/or hardware components can similarly be provided in a shared file to the constrained application 102.

Using a proxy to allow for communication between the constrained application 102 and the middleware subsystem 104 allows for a loose coupling between the constrained application and the middleware subsystem. The use of the proxy allows the constrained application to be implemented in a platform-independent and operating system-independent manner. Also, by using the proxy, specific inter-process communication technologies do not have to be employed—rather, flexibility can be provided since various types of inter-process communication technologies can be used.

Communications between the constrained application 102 and the middleware subsystem 104 can use either the pull model or push model. In the pull model, the constrained application 102 sends a request, through the proxy 116, to the middleware subsystem 104, which then responds with a response to the request. The request and response can be provided in well-formed XML documents for example. A "well-formed" XML document refers to a document conforming to specific rules of the XML Specification (e.g. the XML 1.0 Specification) that allows for a requestor and a responder to understand the content of the document by using XML parsers.

In the push model, the constrained application 102 can send a subscription request (in the form of an XML document, for example), through the proxy 116, to the middleware subsystem 104, and the middleware subsystem can then send a subscription response, through the proxy to the constrained application to acknowledge the subscription request. Later on, when there is an event of interest based on the subscription request, the middleware subsystem can then send an event notification (push notification) through the proxy to the constrained application.

In some implementations, the communication between the constrained application 102 and the middleware subsystem 104 through the proxy 116 can occur within an electronic device. For example, the proxy 116 can include a network loopback connection, which is a type of network socket connection where an entity in the electronic device can access another entity in the electronic device while bypassing a network interface of the electronic device that connects the electronic device to an external network. The network loopback connection can be implemented by using localhost as the address for a network socket—this would direct the communication to a destination entity hosted within the electronic device.

Figure 2:
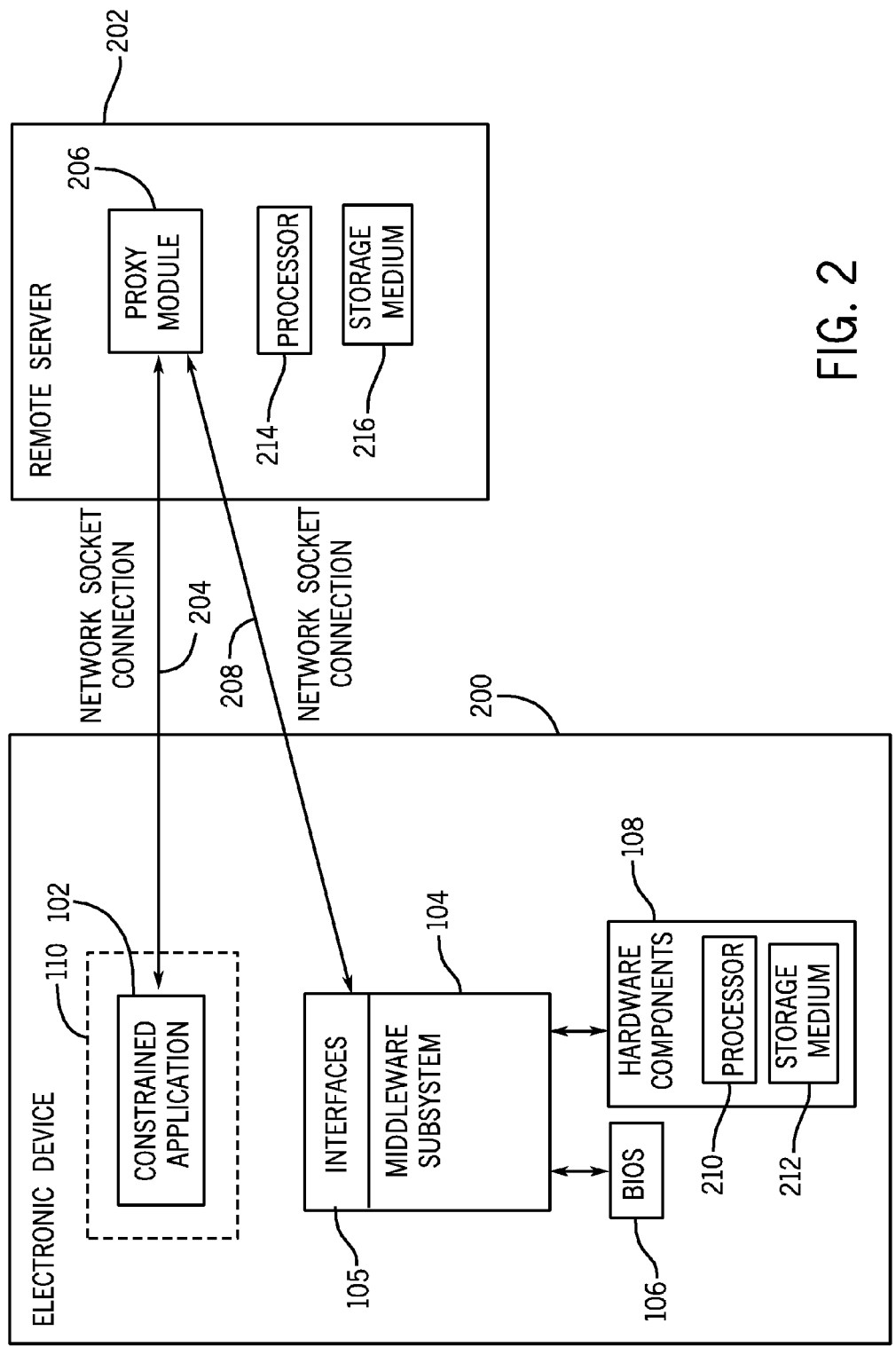
FIG. 2 is a block diagram of an arrangement of components according to alternative implementations.

In alternative implementations, the network socket connection of the proxy 116 can be established over an external network with a remote machine. FIG. 2 illustrates an example arrangement in which the constrained application 102 (in an electronic device 200) is able to access the middleware subsystem 104 (in the electronic device 200) through a remote server 202. In such examples, the constrained application 102 is designed to communicate with a remote entity (such as the remote server 202).

To allow for the constrained application 102 to communicate with the middleware subsystem 104, a network socket connection 204 can be established between the constrained application 102 and a proxy module 206 in the remote server 202. Another network socket connection 208 is established between the proxy module 206 and the middleware subsystem 104. Thus, any command or data to be passed between the constrained application 102 and the middleware subsystem 104 is communicated through the network socket connections 204, 208, and the proxy module 206. Collectively, the network socket connections 204, 208 and the proxy module 206 make up a proxy through which the constrained application 102 is able to communicate with the middleware subsystem 104.

Implementations according to FIG. 2 can be feasible in systems within an enterprise environment or within a cloud environment, for example. In an enterprise environment, services are often provided on enterprise servers, with such services accessible by clients over a network. In accordance with some implementations, a service that can be provided by an enterprise server (such as the remote server 202 of FIG. 2) includes provision of a proxy (that includes the network socket connections 204 and 208 and the proxy module 206) to allow for communication between the constrained application 102 and the middleware subsystem 104.

Similarly, in a cloud-based environment, services can be provided in the cloud (at one or multiple cloud servers). In such cloud-based environment, the remote server 202 is a cloud server that is part of the cloud, which can be accessed by clients such as the electronic device 200.

As further shown in FIG. 2, the hardware components 108 of the electronic device 200 include a processor (or multiple processors) 210, and a storage medium (or storage media) 212. The constrained application 102 and middleware subsystem 104 are executable on the processor(s) 210. The remote server 202 also includes a processor (or multiple processors) 214, and a storage medium (or storage media) 216.

Figure 3:
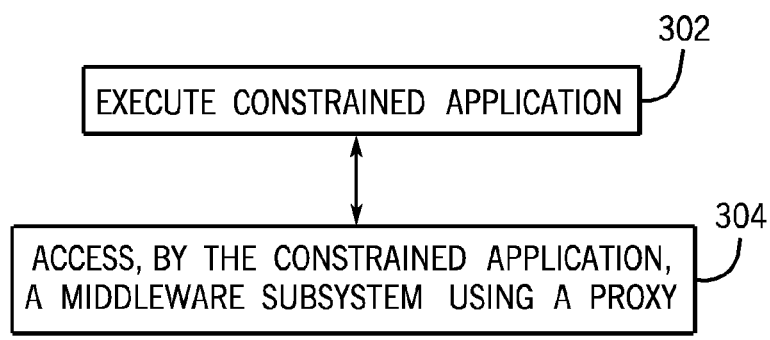
FIG. 3 is a flow diagram of a process according to some implementations.

FIG. 3 is a flow diagram of a process according to some implementations. The process includes executing (at 302) a constrained application (e.g. 102 in FIG. 1 or 2), which is constrained from calling a middleware subsystem (e.g. 104 in FIG. 1 or 2) by a security mechanism. The constrained application can access (at 304) the middleware subsystem using a proxy (such as proxy 116 of FIG. 1 or the proxy including the network socket connections 204, 208 and proxy module 208 of FIG. 2). Access by the constrained application of the middleware subsystem allows the constrained application to communicate with BIOS functions and/or hardware components through the middleware subsystem.

Machine-readable instructions of various modules described above (including the constrained application 102, unconstrained application 114, middleware subsystem 104, and proxy module 206 of FIG. 1 or 2) can be loaded for execution on a processor(s) (e.g. 210 and 214 in FIG. 2). A processor can include a microprocessor, microcontroller, processor module or subsystem, programmable integrated circuit, programmable gate array, or another control or computing device.

Data and instructions are stored in respective storage devices (e.g. storage media 212 and 216 in FIG. 2), which are implemented as one or more computer-readable or machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. A method comprising:
   executing, in an electronic device, a first application constrained from calling a middleware subsystem, wherein the middleware subsystem is able to access a basic input/output system (BIOS) in the electronic device; and
   accessing, by the first application, the middleware subsystem through a proxy, wherein accessing the middleware subsystem allows the first application to communicate with the BIOS, wherein accessing the middleware subsystem through the proxy comprises accessing the middleware subsystem through the proxy that has a portion located at a remote server that is separate from the electronic device that includes the first application and middleware subsystem.

2. The method of claim 1, wherein the proxy is selected from the group consisting of a network socket connection, a driver, and a shared file mechanism.

3. The method of claim 1, wherein the first application is constrained from calling the middleware subsystem by a security mechanism.

4. A method comprising:
   executing, in an electronic device, a first application constrained from calling a middleware subsystem, wherein the middleware subsystem is able to access at least one feature selected from among a basic input/output system (BIOS) and hardware; and
   accessing, by the first application, the middleware subsystem through a proxy, wherein accessing the middleware subsystem allows the first application to communicate with the at least one feature, wherein accessing the middleware subsystem through the proxy comprises accessing the middleware subsystem through the proxy that has a portion located at a remote server that is separate from the electronic device that includes the first application and middleware subsystem.

5. The method of claim 4, wherein the proxy includes a first network socket connection between the first application and an entity in the remote server, and a second network socket connection between the entity and the middleware subsystem, and wherein the accessing of the middleware subsystem through the proxy comprises accessing, by the first application, the middleware subsystem through the first and second network socket connections.

6. The method of claim 4, further comprising:
   executing a second application in the electronic device, where the second application is able to call the middleware subsystem without using the proxy.

7. The method of claim 6, wherein calling the middleware subsystem by the second application comprises invoking an interface of the middleware subsystem, and wherein the first application is constrained from invoking the interface of the middleware subsystem.

8. The method of claim 4, wherein the at least one feature is included in the electronic device.

9. An electronic device comprising:
   hardware components;
   a basic input/output system (BIOS);

a middleware subsystem to provide a mechanism to allow communication with the BIOS;
a constrained application that is constrained from calling the middleware subsystem; and
wherein the constrained application is to access the middleware subsystem through a proxy to allow the constrained application to communicate with the BIOS, wherein the access of the middleware subsystem through the proxy comprises accessing the middleware subsystem through the proxy that has a portion located at a remote server that is separate from the electronic device that includes the constrained application and middleware subsystem.

10. The electronic device of claim 9, further comprising:
a second application, where the second application is able to call the middleware subsystem without using the proxy.

11. The electronic device of claim 10, wherein the middleware subsystem includes an application programming interface, wherein the second application is able to call the middleware subsystem by making a call to the application programming interface, and wherein the constrained application is constrained from calling the application programming interface.

12. The electronic device of claim 9, wherein the constrained application is constrained from calling the middleware subsystem by a security mechanism.

13. The electronic device of claim 12, wherein the security mechanism includes a sandbox.

14. The electronic device of claim 9, wherein the proxy includes a plug-in driver for interacting with the constrained application.

15. The electronic device of claim 9, wherein the proxy includes a shared file mechanism.

16. An article comprising at least one non-transitory machine-readable storage medium storing instructions that upon execution cause an electronic device to:
execute a first application constrained from calling a middleware subsystem, wherein the middleware subsystem is able to access a basic input/output system (BIOS) in the electronic device; and
access, by the first application, the middleware subsystem through a proxy, wherein accessing the middleware subsystem allows the first application to communicate with the BIOS, wherein accessing the middleware subsystem through the proxy comprises accessing the middleware subsystem through the proxy that has a portion located at a remote server that is separate from the electronic device that includes the first application and middleware subsystem.

17. The article of claim 16, wherein the first application is constrained from calling the middleware subsystem by a security mechanism.

18. The article of claim 16, wherein the instructions upon execution cause the electronic device to further establish between the first application and the remote server, a first network socket connection;
establish, between the middleware subsystem and the remote server, a second network socket connection,
wherein the accessing of the middleware subsystem through the proxy comprises accessing, by the first application, the middleware subsystem through the first and second network socket connections.

19. The article of claim 16, wherein the electronic device includes a hardware component, and the first application is constrained from accessing the hardware component, and wherein the instructions upon execution cause the electronic device to further:
access, by the first application, the middleware subsystem through the proxy to allow the first application to communicate with the hardware component.

* * * * *